US006439561B1

(12) United States Patent
Ausilio

(10) Patent No.: US 6,439,561 B1
(45) Date of Patent: Aug. 27, 2002

(54) MODULAR SYSTEM AND FIXTURE FOR POSITIONING A WORKPIECE

(75) Inventor: John S. Ausilio, Clinton Township, MI (US)

(73) Assignee: Ultimate Standard Tooling International, LLC, Clinton Township, MI (US)

( * ) Notice: Subject to any disclaimer, the term of this patent is extended or adjusted under 35 U.S.C. 154(b) by 0 days.

(21) Appl. No.: 09/604,869

(22) Filed: Jun. 28, 2000

(51) Int. Cl.[7] ................................................. B23Q 1/00
(52) U.S. Cl. .............................. 269/47; 269/71; 269/69; 269/900; 269/238
(58) Field of Search ............................ 269/309, 71, 69, 269/45, 50, 51, 900, 904, 88, 47, 97, 238

(56) References Cited

U.S. PATENT DOCUMENTS

| | | | |
|---|---|---|---|
| 4,500,079 A | 2/1985 | Morghen | 269/47 |
| 4,655,445 A | 4/1987 | Morse | 269/304 |
| 4,801,225 A | 1/1989 | Morghen | 409/218 |
| 4,896,086 A | 1/1990 | Miyahara et al. | 318/568.1 |
| 4,968,012 A | 11/1990 | Haddad et al. | 269/88 |
| 5,026,033 A | 6/1991 | Roxy | 269/45 |
| 5,044,616 A | 9/1991 | Jacob | 269/309 |
| 5,362,036 A | 11/1994 | Whiteman | 269/51 |
| 5,415,383 A * | 5/1995 | Ausilio | 269/238 |
| 5,481,811 A | 1/1996 | Smith | 33/573 |
| 5,516,089 A | 5/1996 | Seniff et al. | 269/304 |
| 5,918,868 A * | 7/1999 | Bruchman | 269/238 |
| D439,137 S * | 3/2000 | Ausilio | D8/354 |
| 6,171,540 B1 * | 1/2001 | Ibaragi | 269/238 |
| D443,810 S * | 6/2001 | Ausilio | D8/354 |

* cited by examiner

Primary Examiner—Joseph J. Hail, III
Assistant Examiner—Lee Wilson
(74) Attorney, Agent, or Firm—Duane Morris LLP

(57) ABSTRACT

A fixture is provided for locating a workpiece in space including a blade having a longitudinal axis, a bottom edge, a top edge, and a plurality of through-bores. At least two of the through-bores are positioned on the blade to define a predetermined location relative to the top and bottom edges, and together with a riser, allow for the precise positioning of a locating pin, or other datum point locator, that may be attached to the blade. The blade also includes a mounting arm that is eccentrically located on a top edge. The mounting arm has a plurality of through-bores, where at least two of the through-bores define a predetermined location relative to the top edge. A locating pin, or other datum point locator is attached to the mounting arm. The fixture is particularly adapted for use in a modular system of fixtures, in that by stocking a variety of blades, each with a different set of through-bore locations, a different positioning fixture may be formed, as needed, without the need for custom manufacturing of blades. Also, due to the eccentric location of the mounting arm on the blade, a simple rotation of the blade about its longitudinal axis allows for a doubling of the locations at which a locating pin, or other datum point locator may be positioned in space. These features allow for kits of blades to provided from which a variety of fixtures may be created.

18 Claims, 7 Drawing Sheets

MODULAR SYSTEM AND FIXTURE FOR POSITIONING A WORKPIECE

FIELD OF THE INVENTION

The present invention generally relates to workpiece positioning systems, and more particularly to a modular apparatus and system for positioning a workpiece.

BACKGROUND OF THE INVENTION

Workpiece positioning an systems are well known in the art. For example, U.S. Pat. No. 4,655,445, issued to Morse discloses an apparatus for selectively positioning a workpiece adjacent to a guide on a substantially planar work surface of a power tool assembly. The positioning apparatus is adapted to selectively position the workpiece at selected ones of a plurality of predetermined lateral offsets with respect to a cutter. The positioning apparatus includes an indexing member having a plurality of index holes and an elongated index pin element. The indexing member is affixed to either the workpiece or the guide, and the pin element is affixed to the other of the workpiece or the guide, so that the workpiece may be positioned adjacent to the indexing member and the guide, with the pin element extending through and interferingly engaging one of the index holes. This apparently permits the generation of a succession of cuts in a workpiece which are substantially uniformly spaced along a reference axis.

U.S. Pat. Nos. 4,500,079 and 4,801,225, issued to Morghen disclose a removable and replaceable locating pin adapted to locate a workpiece on a tooling fixture for machining. The locating pin is adapted to cooperate with a workpiece for positioning the workpiece in various directions of restraint. The locating pin is provided with manually actuatable locking means that permit easy adjustment or removal of the specific locator pin as a particular machining operation may require.

U.S. Pat. No. 4,896,086, issued to Miyahara, et al., discloses a method and apparatus for positioning a workpiece to a pallet on a working line. The line transports plural kinds of workpieces. Plural positioning pins are provided at various locations on each pallet to enable all the workpieces to be carried by the pallets. Each positioning pin has a set position and a reset position. All positioning pins are first reset to the reset position, thereafter, a selected positioning pin is set to the set position to accommodate a particular kind of workpiece. The positioning of the workpiece is accomplished by fitting a positioning hole defined by the selected workpiece onto the selected positioning pin.

U.S. Pat. No. 4,968,012, issued to Haddad, et al., discloses a modular workpiece holding apparatus for locating and holding a workpiece in a predetermined position. The apparatus includes a base having a plurality of external faces, each with a plurality of bores arranged in an X-Y grid pattern of parallel rows. The bores alternate vertically and horizontally between first and second different diameter bores. A riser is mounted at a predetermined position on the base by bushings and fasteners extending between the riser and the bores in the base. The bushings in each riser are arranged in diagonally opposed pairs such that one pair of bushings engages the first diameter bores in the base, while the second opposed pair of bushings engages the second enlarged diameter bores in the base. A workpiece attachment member is mounted on the mounting head end of each riser to locate and hold a workpiece. The mounting head of each riser is axially in line with the riser mounting base or offset from the riser mounting base. Each bushing includes an internal bore having a threaded end portion and an enlarged, coaxial, smooth portion. Each fastener includes a plurality of threads adjacent one end and an unthreaded portion extending from the threaded end so as to be movably retainable within a bushing in the riser mounting base after the threaded end portion of the fastener is threaded through the threaded end of the bore in the riser mounting base.

U.S. Pat. No. 5,026,033, issued to Roxy, discloses a universal system for support and positioning a workpiece for use with a device such as an inspection system. A plurality of individual alignment devices are inserted into predetermined holes of a platform having a matrix of holes. Individual alignment devices support, clamp, datum point position, and provide reference points. Each alignment device includes stanchions of varying length. These stanchions appear to be capable of being connected to each other. Once an alignment device is positioned in a hole, it can be fine tuned in all directions to get an exact location, so that workpieces of widely varying types, shapes and sizes can be positioned using the same set of alignment devices.

U.S. Pat. No. 5,044,616, issued to Jakob discloses a locating device for positioning a workpiece on a processing apparatus. A first embodiment includes a base and a fixture plate with positioning means between the base and the fixture plate. An abutment defines a fixed reference point for locking the fixture plate on the base through a clamping mechanism. The clamping mechanism also includes release cylinders so that the fixture plate can be quickly interchanged for introducing a new workpiece. A second embodiment includes a base structure that comprises a first clamping unit and a second clamping unit that support a fixture plate. First positioning means secured to each clamping unit cooperate with second positioning means secured to the fixture plate. Clamping means engage and lock the fixture plate in position. The clamping means include locking members that are slidably disposed in channels in the blocks.

U.S. Pat. No. 5,362,036, issued to Whiteman discloses a modular welding fixture for positioning a workpiece. The fixture includes a base table having an array of openings through the surface and an array of locator mounting holes co-located in spaced relationship, with respect to the openings, to accommodate at least one vertical end locator having a base plate that is removably mountable to the base table at preselected positions. The locator has means for locating and holding at least a portion of a workpiece. The fixture further includes at least one horizontal locator having a base plate that is removably mountable to the base table at preselected positions, and the base plate includes means for locating and holding at least a portion of a workpiece.

U.S. Pat. No. 5,481,811, issued to Smith discloses a modular system for the support and positioning of a workpiece for use with an inspection system. The modular system includes a base having a plurality of exterior faces, at least some of which have an array of equally spaced holes forming a grid pattern. At least one riser is attached to the base cube by a fastener, which can be inserted into the riser by defeating an outwardly biased locking member at the inner end of the fastener, extending through the riser and into the holes of the base cube. The fastener is used to provide positive location and fastening of the risers to the base cube. Functions of individual risers include support, clamping, datum point positioning and providing reference points.

U.S. Pat. No. 5,516,089, issued to Seniff et al., discloses a workpiece locating unit that is receivable in a T-slot formed in a workpiece supporting table member. It provides a pin or other locating device cooperable with a locating feature on a workpiece to aid in accurately positioning the workpiece on the work supporting surface of the table member. The unit has four corners each providing an abutment surface for engagement with one or the other of two vertical slot surfaces. Two diagonally opposite ones of the abutment surfaces are rigid and the other two diagonally opposite ones of the abutment surfaces are resilient. The resilient abutment surfaces resiliently engage the two vertical surfaces of the slot and urge the unit about a vertical axis to hold the rigid abutment surfaces engaged with the vertical slot surfaces eliminating lateral looseness between the unit and the table member and providing accurate positioning of the locating device of the unit as the unit is moved from one position to another along the length of the slot.

These and other prior art positioning systems often require well trained and technically sophisticated personnel to properly operate them. This adds to the cost and complexity of such systems. Also such prior art positioning systems do not lend themselves to a modular design that allows for fine adjustments of position of a workpiece through the selection of easily identifiable and assembled modular parts. As a consequence, there has been a long felt need for a workpiece positioning system that avoids the foregoing problems in the prior art.

SUMMARY OF THE INVENTION

The present invention provides a fixture for locating a workpiece in space comprising a blade having a longitudinal axis, a bottom edge, a top edge, and a plurality of through-bores. At least two of the through-bores are positioned on the blade so as to define a predetermined location relative to the top and bottom edges, and together with a riser, allow for the precise positioning of a locating pin, or other datum point locator, that may be attached to the blade. The blade also includes a mounting arm that is eccentrically located on a top edge. The mounting arm has a plurality of through-bores wherein at least two of the through-bores comprise a predetermined location relative to the top edge. A locating pin, or other datum point locator is attached to the mounting arm.

The present invention is particularly adapted for use in a modular system of fixtures, in that by stocking a variety of blades, each with a different set of through-bore locations, a different positioning fixture may be formed, as needed, without the need for custom manufacturing of blades. Also, due to the eccentric location of the mounting arm on the blade, a simple rotation of the blade about its longitudinal axis allows for a doubling of the locations at which a locating pin, or other datum point locator may be positioned in space.

In one embodiment of the invention, a kit for forming a variety of fixtures for positioning a workpiece is provided that includes a plurality of position determining modules wherein each module comprises a blade having a longitudinal axis, a bottom edge, a top edge, and a plurality of position determining modules wherein each module comprises a blade having a longitudinal axis, a bottom edge, a top edge, and a plurality of through-bores. At least two of the through-bores positionally correspond to at least two through-bores in the top portion of the riser. In this way, when the through-bores of the blade are positioned in aligned relation with the through-bores of the riser, the top edge of the blade is at a predetermined, and known position. The blade further includes a mounting arm eccentrically located on the top edge, relative to the longitudinal axis. The mounting arm has a plurality of through-bores wherein at least two of the through-bores comprise a predetermined location relative to the top edge of the blade. Thus, a kit of blades formed in accordance with the invention may be stocked so that a variety of positioning fixtures may be formed, as needed, without the need for custom manufacturing blades.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
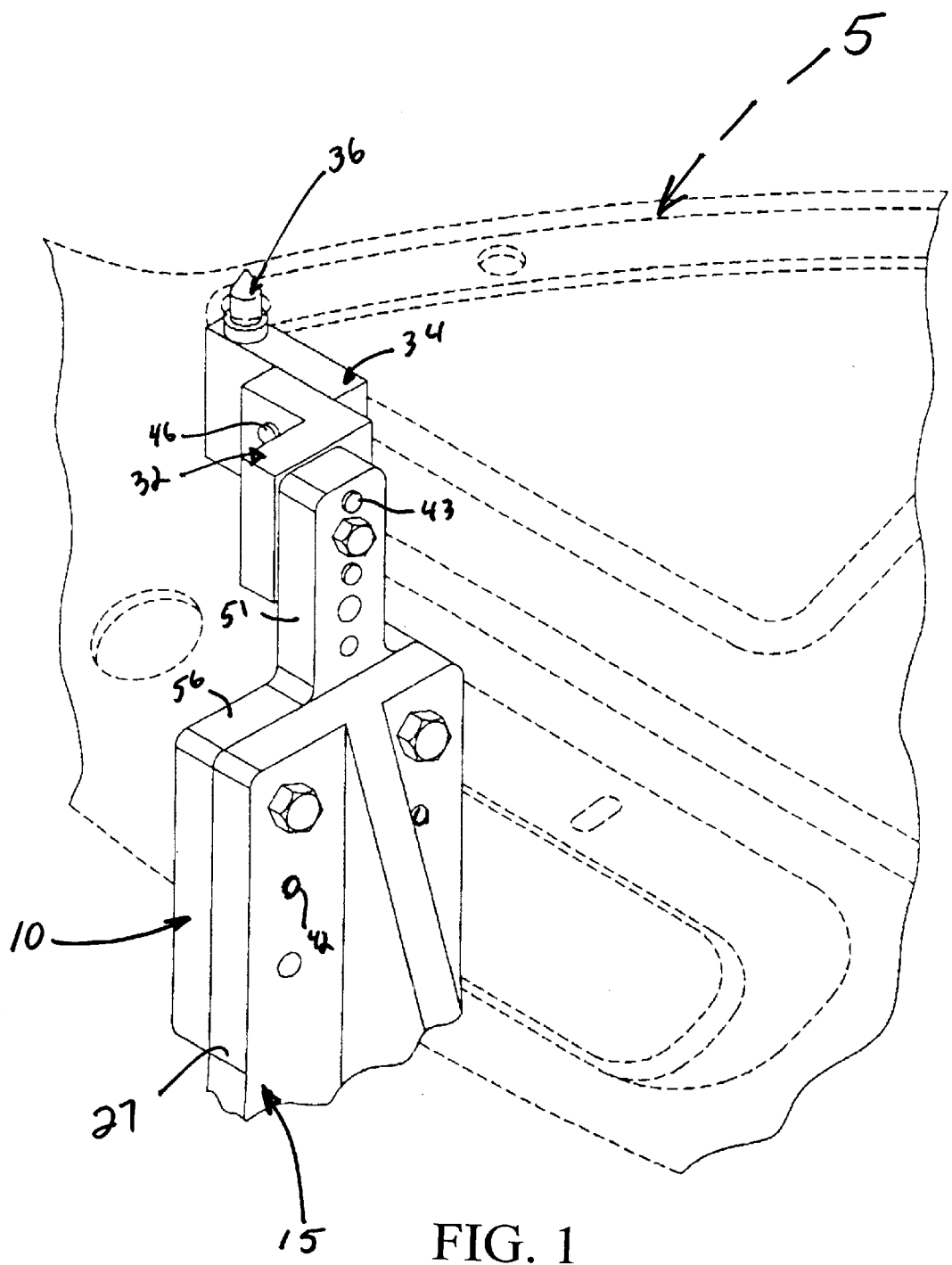
FIG. 1 is a perspective view of a fixture for locating a workpiece formed in accordance with the present invention, with a workpiece shown in phantom.

This description of preferred embodiments is intended to be read in connection with the accompanying drawings, which are to be considered part of the entire written description of this invention. In the description, relative terms such as "horizonal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 3:
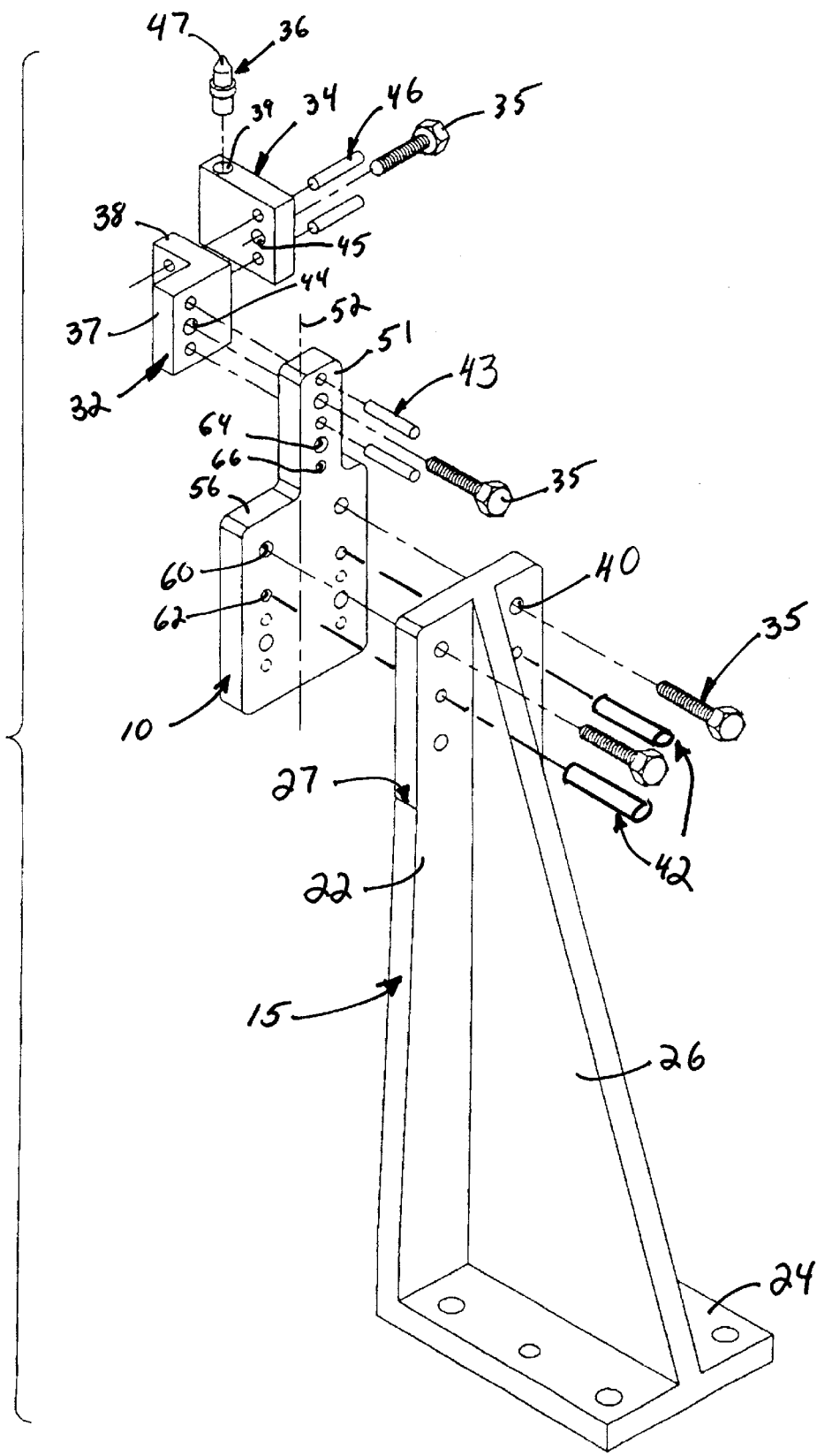
FIG. 3 is an exploded view of the fixture for locating a workpiece shown in FIG. 1.
Figure 4:
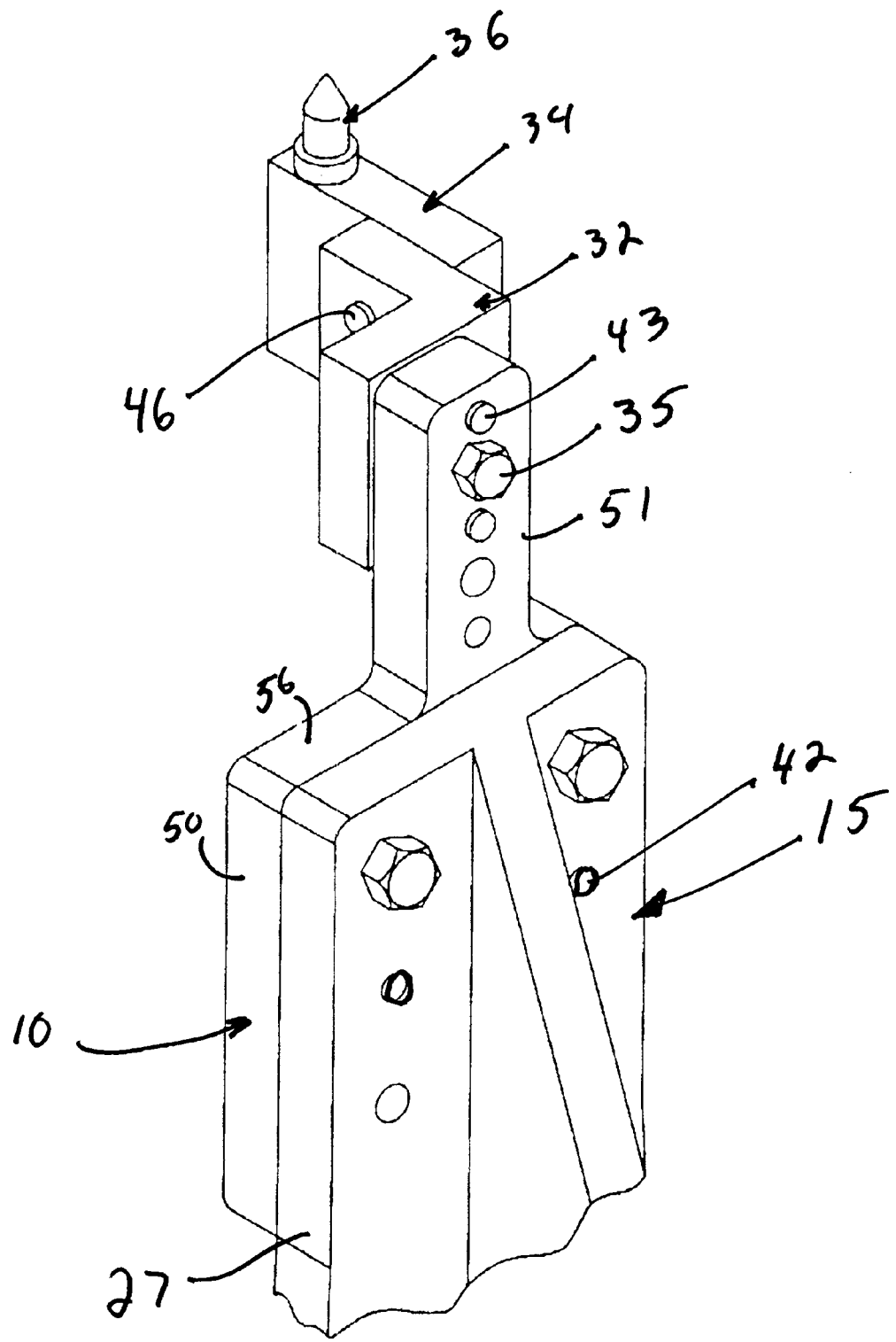
FIG. 4 is a perspective view of a fixture for locating a workpiece formed in accordance with the present invention, with a blade arranged to locate a pin in one available position in space.
Figure 5:
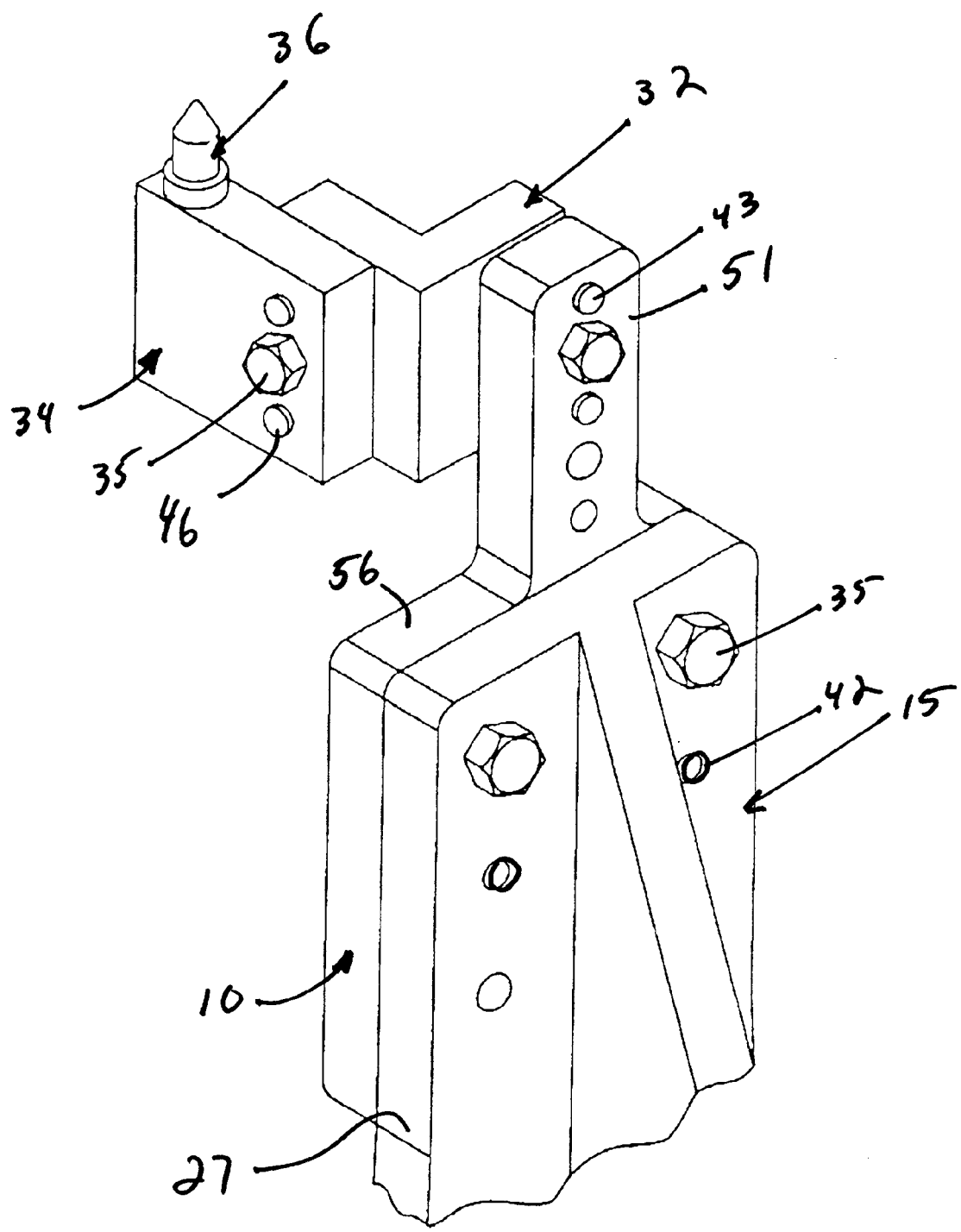
FIG. 5 is a perspective view of a fixture for locating a workpiece formed in accordance with the present invention, with a blade arranged to locate a pin in an alternative available position in space.
Figure 6:
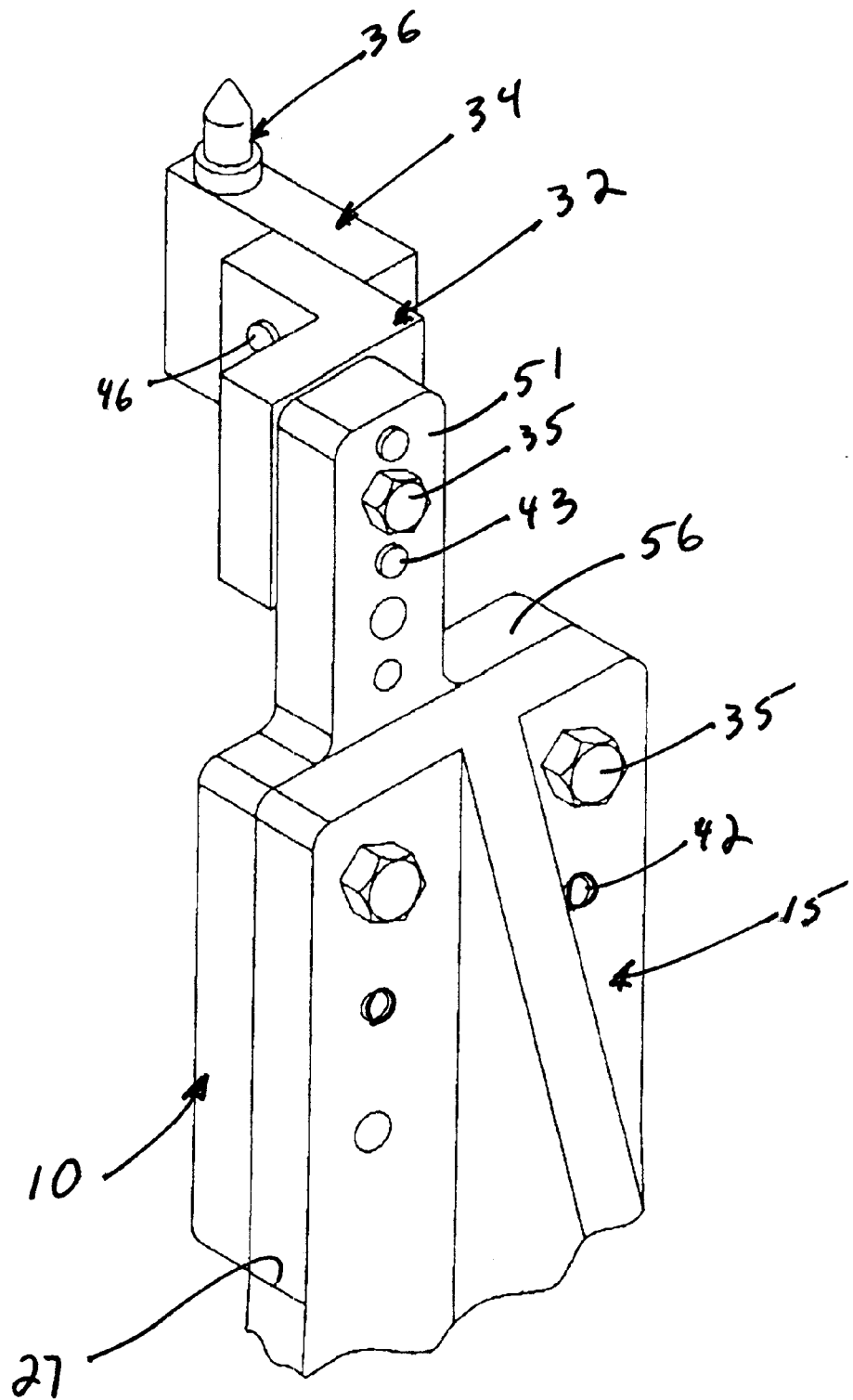
FIG. 6 is a perspective view of a fixture for locating a workpiece formed in accordance with the present invention, with a blade arranged to locate a pin in another alternative available position in space.
Figure 7:
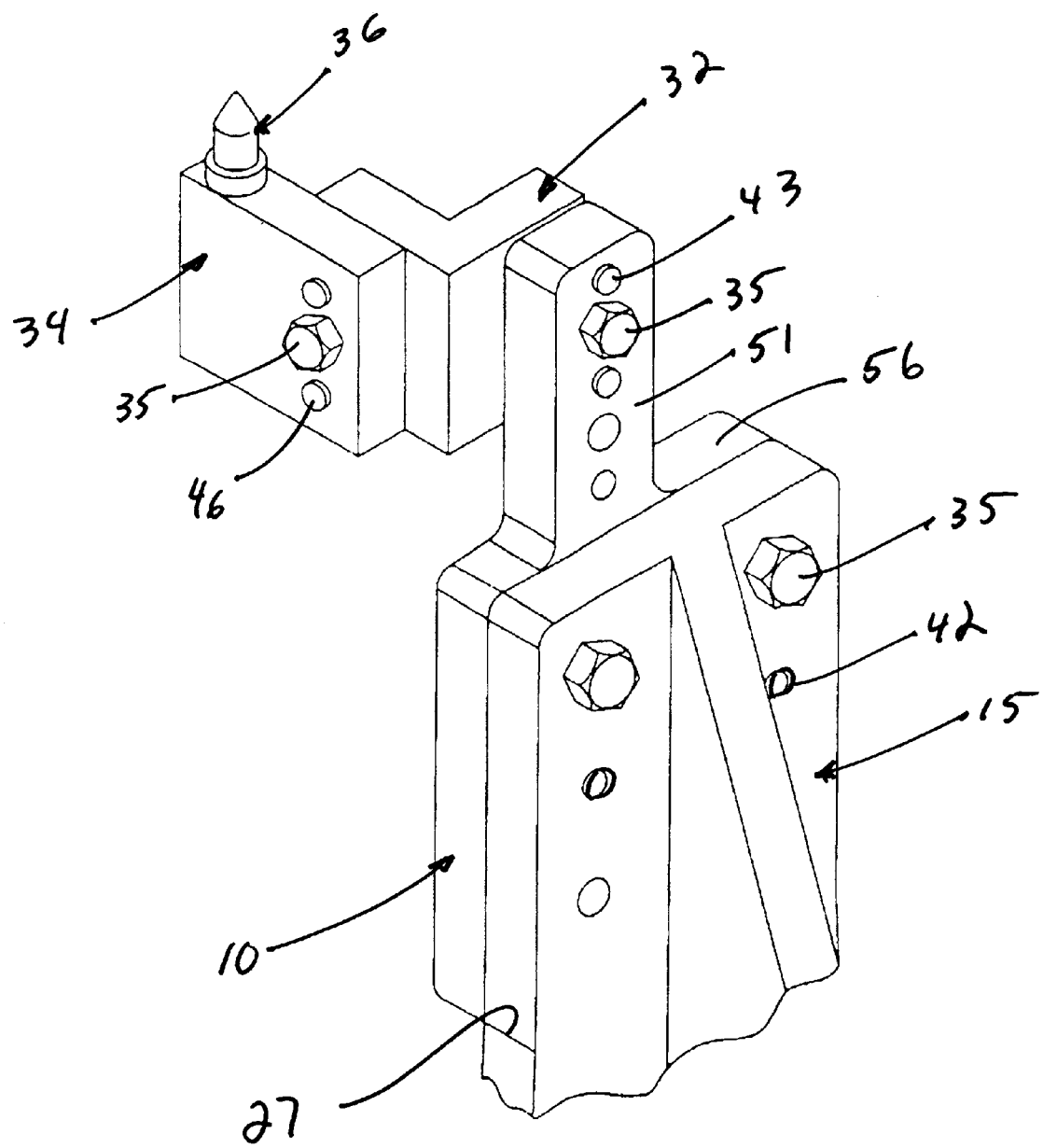
FIG. 7 is a perspective view of a fixture for locating a workpiece formed in accordance with the present invention, with a blade arranged to locate a pin in yet another alternative available position in space.

Referring to FIGS. 1 and 3, the position of a workpiece 5, e.g., a hood for an automobile, may be located by one or more modular positioning blades 10 mounted to a riser 15.

Risers 15 are often mounted on a platform in a predetermined matrix of holes having an adequate distance from each other such that the risers can be position virtually any size or shape workpiece 5. The dimensions of risers 15 are subject to industry agreed upon standard heights with specific tolerance allowances which would be known to those skilled in the art.

Risers 15 include a mounting plate 22 and a seat plate 24, with a stiffening support 26 fastened between them to add to the rigidity and ability to support significant loads. Mounted to a top portion 27 of each riser 15 are a modular positioning blade 10, a right-angle block 32, a pin retainer 34, and a locating pin 36, all of which are adapted to provide support for workpiece 5 at specific datum point positions in space. A plurality of through-bores 40 are defined in top portion 27 of each riser 15 for operatively locating a modular positioning blade 10, via dowel pins 42, and for fastening modular positioning blade 10 to riser 15, via conventional fasteners, e.g., bolts 35 or the like.

Right-angle block 32 includes a foot 37 and an arm 38 that comprise a plurality of selectively positioned through-bores 44 that are sized to receive fasteners, e.g., bolts 35 or the like, and dowel pins 43. Pin retainer 34 may comprise another right-angle block or an rectangular block having a plurality of selectively positioned through-bores 45 that are sized to receive fasteners, e.g., bolts 35 or the like, and dowel pins 46. Locating pin 36 comprises a relatively elongate cylindrical shaft having a conical tip 47. Locating pin 36 is received within a correspondingly sized and shaped recess 39 defined in pin retainer 34. Right-angle block 32, pin retainer 34, and locating pin 36 are all normally formed from a dimensionally stable metal, such as steel or the like.

Figure 2:
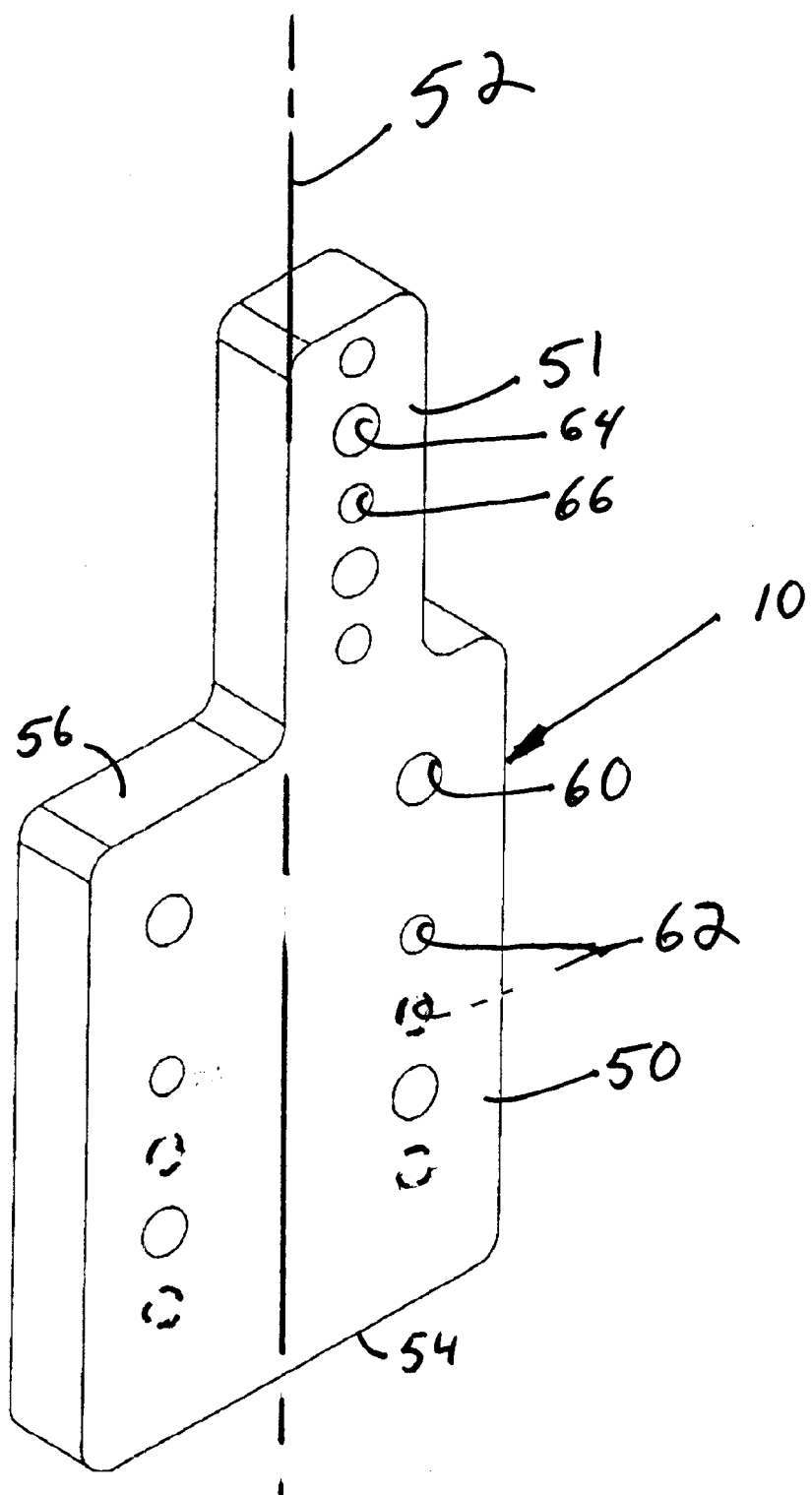
FIG. 2 is a modular blade formed in accordance with the present invention.

Referring to FIG. 2, modular positioning blade 10 includes a riser mount 50 and a block mount 51, and comprises a height gauge adapted for precisely positioning locating pin 36 at a predetermined position in space. More particularly, riser mount 50 is generally rectangularly shaped, with a longitudinal axis 52, a bottom edge 54, a top edge 56, and a plurality of through-bores. Through-bores 60 are sized and shaped to receive fasteners, such as bolts 35 or the like. Riser mount 50 also includes a pair of positioning-bores 62 that are sized, shaped, and selectively located on modular positioning blade 10 to operatively receive dowel pins 42, and thereby to selectively position modular positioning blade 10 on riser 15. Advantageously, positioning-bores 62 may be located at varying fixed distances from bottom edge 54, e.g., fifty-five, seventy, or eighty-five millimeters, as shown in phantom in FIG. 2. Thus, a variety of modular positioning blades 10 may be provided, each having positioning bores 62 at different locations along the length of riser mount 50, e.g., in fifteen millimeter increments as measured from bottom edge 54. Advantageously, a family or kit may be provided comprising a plurality of individual modular positioning blades 10, each having a different location of positioning-bores 62.

Block mount 51 is coplanar with riser mount 50, and projects outwardly from top edge 56 to form a mounting arm portion of modular positioning blade 10. Preferably, block mount 51 is eccentrically located on top edge 56, relative to longitudinal axis 52. For example, in one preferred embodiment block mount 51 is positioned about fifty-five millimeters from a side edge of riser mount 50. Block mount 51 includes a plurality of through-bores 64 that are sized to receive fasteners, e.g., bolts 35 or the like, and a plurality of selectively located positioning-bores 66 that are sized and shaped to receive dowel pins 43.

Of course, it will be understood that the location of positioning-bores 62 in riser mount 50 determine the location (height) of block mount 51 above riser 15. Also, it should be understood that when modular positioning blade 10 is rotated by 180 degrees about longitudinal axis 52 the location of positioning-bores 62 relative to corresponding through bores 40 remains invariant. In this way, block mount 51 may be selectively located to the right or the left of center of riser 15, at a precisely known location, by merely rotating modular positioning blade 10. In addition, by adjusting the orientation of right-angle block 32 and pin retainer 34 relative to block mount 51, tip 47 of locating pin 36 may be positioned at least at four separate and distinct datum point locations in space (and relative to the position of riser 15) without need for additional modular positioning blades 10 or further adjustments (see, FIGS. 4–7).

ADVANTAGES OF THE INVENTION

Numerous advantages are obtained by employing the present invention.

More specifically, a modular system and apparatus for positioning a workpiece is provided which avoids all of the aforementioned problems associated with prior art devices.

In addition, a modular system and apparatus for positioning a workpiece is provided which does not require well trained and technically sophisticated personnel to properly operate.

Furthermore a modular system and apparatus for positioning a workpiece is provided which reduces the cost and complexity associated with the accurate positioning of a workpiece, such as a portion of an automobile.

Also, a system and apparatus for positioning a workpiece is provided which incorporates a modular design that allows for fine adjustments of position of a workpiece through the selection of easily identifiable, standardized modular blades that are easily assembled to accommodate a plurality of required workpiece locations.

It is to be understood that the present invention is by no means limited only to the particular constructions herein disclosed and shown in the drawings, but also comprises any modifications or equivalents within the scope of the claims.

What is claimed is:

1. In a fixture for locating a workpiece in space of the type including a riser having a plurality of height defining through-bores, and supporting a plurality of support blocks and a locating pin positioned in at least one of said support blocks so that said locating pin is disposed at a predetermined fixed location above said riser and associated with said height defining through-bores for locating said workpiece; wherein the improvement comprises:

a blade mounted to said riser, said blade having a longitudinal axis, a bottom edge, a top edge, and a plurality of through-bores defined therethrough wherein at least two of said through-bores comprise a predetermined location relative to said top and bottom edges and correspond to at least two of said plurality of height defining through-bores, and said blade further including a mounting arm eccentrically located on said top edge relative to said longitudinal axis, said mounting arm having a plurality of through-bores wherein at least two of said through-bores comprise a predetermined location relative to said top edge for locating said support blocks and said locating pin in space.

2. A blade according to the improvement of claim 1 wherein said blade comprises a height gauge adapted for precisely positioning said locating pin at a predetermined position in space.

3. A blade according to the improvement of claim 1 wherein said blade is rectangularly shaped and a portion of said plurality of through-bores are sized and shaped to receive fasteners.

4. A blade according to the improvement of claim 1 wherein said at least two of said through-bores are sized, shaped, and selectively located on said blade to receive pins thereby to selectively position said blade on said riser.

5. A blade according to the improvement of claim 4 wherein said at least two of said through-bores are located at about fifty-five millimeters from said bottom edge.

6. A blade according to the improvement of claim 4 wherein said at least two of said through-bores are located at about seventy millimeters from said bottom edge.

7. A blade according to the improvement of claim 4 wherein said at least two of said through-bores are located at about eighty-five millimeters from said bottom edge.

8. A blade according to the improvement of claim 1 wherein said mounting arm is coplanar with a riser mount portion of said blade and projects outwardly from said top edge of said blade.

9. A blade according to the improvement of claim 1 wherein said mounting arm is positioned about fifty-five millimeters from a side edge of said blade.

10. A fixture for locating a workpiece in space comprising:
  a riser including a top portion having at least two through-bores;
  a blade having a longitudinal axis, a bottom edge, a top edge, and a plurality of through-bores wherein at least two of said through-bores positionally correspond to said at least two through-bores in said top portion of said riser so that when said at least two of said through-bores of said blade are positioned in aligned relation with said at least two of said through-bores of said riser, said top edge of said blade is at a predetermined position, said blade further including a mounting arm eccentrically located on said top edge relative to said longitudinal axis, said mounting arm having a plurality of through-bores wherein at least two of said through-bores comprise a predetermined location relative to said top edge.

11. A kit for forming a variety of fixtures for positioning a workpiece comprising:
  a riser including a top portion having at least two through-bores; and
  a plurality of position determining blades each having a longitudinal axis, a bottom edge, a top edge, and a plurality of through-bores wherein at least two of said through-bores positionally correspond to at least two through-bores in said top portion of said riser so that when said at least two of said through-bores of said blade are positioned in aligned relation with said at least two of said through-bores of said riser, said top edge of said blade is at a predetermined position, said blade further including a mounting arm eccentrically located on said top edge relative to said longitudinal axis, said mounting arm having a plurality of through-bores wherein at least two of said through-bores comprise a predetermined location relative to said top edge.

12. A kit for forming a variety of fixtures for positioning a workpiece according to claim 11 wherein at least one of said plurality of blades comprises at least two of said through-bores located at about fifty-five millimeters from said bottom edge.

13. A kit for forming a variety of fixtures for positioning a workpiece according to claim 11 wherein at least one of said plurality of blades comprises at least two of said through-bores located at about seventy millimeters from said bottom edge.

14. A kit for forming a variety of fixtures for positioning a workpiece according to claim 11 wherein at least one of said plurality of blades comprises at least two of said through-bores located at about eighty-five millimeters from said bottom edge.

15. A fixture for locating a workpiece in space comprising:
  a riser including a top portion having at least two through-bores;
  a blade having a longitudinal axis, a bottom edge, a top edge, and a plurality of through-bores wherein at least two of said through-bores positionally correspond to said at least two through-bores in said top portion of said riser so that when said at least two of said through-bores of said blade are positioned in aligned relation with said at least two of said through-bores of said riser, said top edge of said blade is at a predetermined position, said blade further including a mounting arm eccentrically located on said top edge relative to said longitudinal axis, said mounting arm having a plurality of through-bores wherein at least two of said through-bores comprise a predetermined location relative to said top edge, wherein said mounting arm comprises a first position and a second position relative to said longitudinal axis and said blade is rotatable about said longitudinal axis so as to selectively shift said mounting arm between said first position and second position, and further comprising a right-angle block releasably fastened to said mounting arm, a pin retainer releasably fastened to said right-angle block, and a locating pin positioned on said pin retainer and arranged so as to provide a predetermined datum point position in space.

16. A fixture according to claim 15 wherein said right-angle block comprises a first position and a second position relative to said mounting arm so that said right-angle block may be selectively shifted between said first position and second position.

17. A fixture according to claim 16 wherein said right-angle block and said mounting arm are selectively shiftable between said respective first and second positions so as to provide at least four distinct datum point positions in space of said locating pin.

18. A fixture for locating a workpiece comprising:
  a locating pin;
  at least one dowel pin;
  at least one block including a plurality of through-bores and supporting said locating pin;
  a riser having a plurality of height defining through-bores; and
  a blade mounted to said riser, said blade having a longitudinal axis, a bottom edge, a top edge, and a plurality of through-bores defined therethrough wherein at least two of said through-bores comprise a predetermined location relative to said top and bottom edges and correspond to at least two of said plurality of height defining through-bores, said blade including a mounting arm eccentrically located on said top edge relative to said longitudinal axis, said mounting arm having a plurality of through-bores wherein at least two of said through-bores comprise a predetermined location relative to said top edge and correspond in position to at least two of said plurality of through-bores in said at least one block so that said at least one dowel pin may be removably inserted through said correspondingly positioned through-bores so as to support and locate said at least one block on said blade and thereby locate said locating pin at a predetermined position in space.

* * * * *